Patented Oct. 10, 1922.

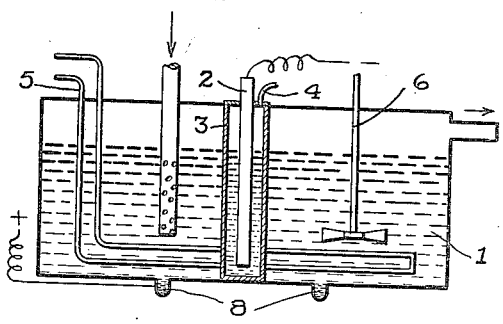
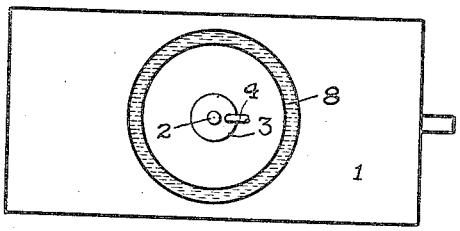
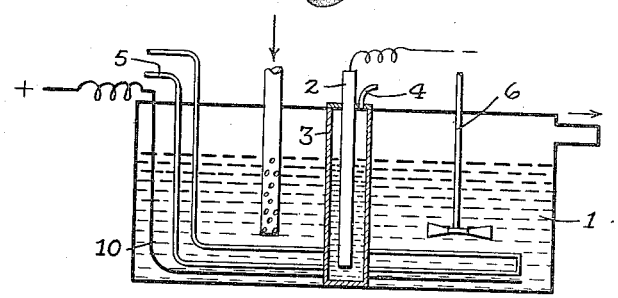
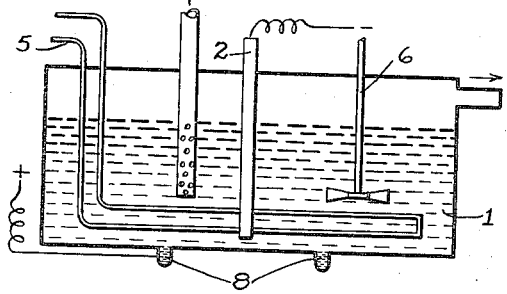
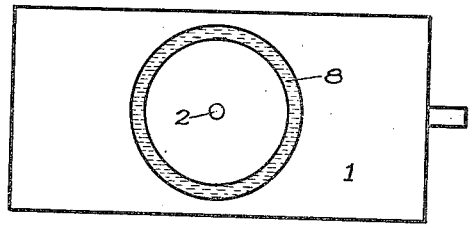

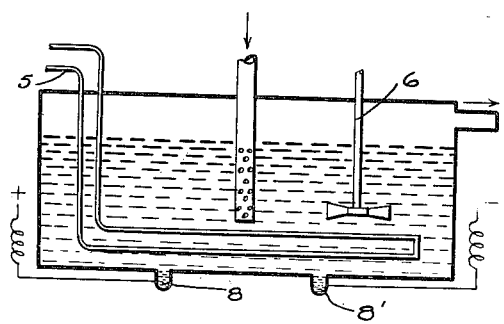
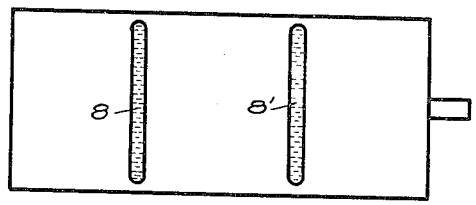
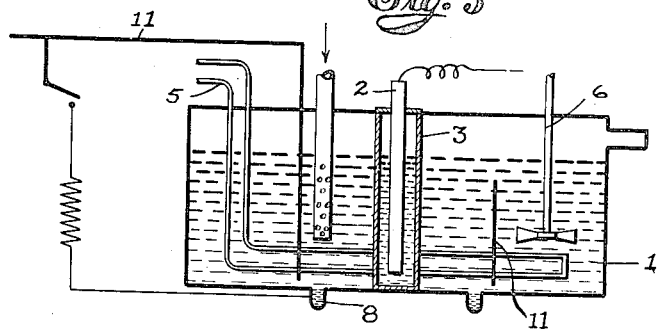
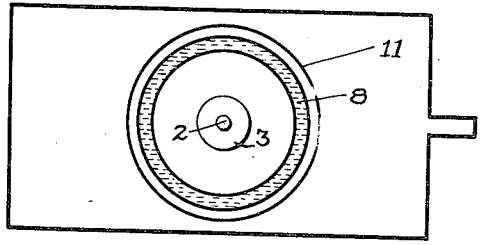

1,431,301

UNITED STATES PATENT OFFICE.

NATHAN GRÜNSTEIN, OF FRANKFORT-ON-THE-MAIN, AND PAUL BERGE, OF GRIESHEIM-ON-THE-MAIN, GERMANY.

PROCESS OF EXTENDING THE CATALYTIC ACTIVITY OF MERCURY COMPOUNDS.

Application filed May 21, 1919. Serial No. 298,810.

*To all whom it may concern:*

Be it known that we, NATHAN GRÜNSTEIN and PAUL BERGE, of Frankfort-on-the-Main and Griesheim-on-the-Main, respectively, Germany, have invented certain new and useful Improvements in a Process of Extending the Catalytic Activity of Mercury Compounds (for which we have filed applications in Germany August 10, 1916, and March 3, 1917; Austria August 9, 1917, and Hungary August 13, 1917), of which the following is a specification.

Our invention relates to catalyzers and especially to catalyzers such as the compounds of mercury, and has for an object to provide a process for increasing the catalytic activity of mercury compounds.

It is a well known fact that mercury compounds, such as are employed in processes involving the oxidation of acetylene, for instance, in the production of acetaldehyde from acetylene, lose their catalytic activity after a period of use and require reconversion into a catalytic salt by undergoing a special process for regeneration.

We have discovered that the catalytic activity of these mercury compounds may be increased by treating the acid reaction liquid containing the mercury salts with an electric current. The passage of the electric current through the said liquid may be simultaneous, or may alternate, with the current of the acetylene gas and may take place either within or without the container in which the chemical reaction takes place. In carrying this electrolytic treatment into effect, mercury is either used as the anode, or care is taken to bring the anode into contact with added mercury or with the mercury which separates from the reaction liquid; in the latter cases, the mercury becomes, naturally, the anode. These conditions prevailing, the mercury is oxidized by the electric current and is converted into a catalytically active mercury-salt by the acid in the solution. A proper adjustment of the amperage enables one to oxidize a sufficient quantity of mercury to ensure that there is continually present, within the solution, the quantity of mercury-salt that is required to produce the chemically additive association of the acetylene aimed at; hence, an intensive absorption of acetylene can be continually effected without the necessity of adding fresh catalyzer for that purpose.

When working in accordance with our present invention, the mercury-salt may initially be replaced, entirely or partly, by metallic mercury which is converted by the electric current into a catalytically active salt of mercury.

The cathode consisting of a suitable metal, such, for instance, as platinum, lead, mercury, may be placed within a porous container which serves to separate it from the reaction liquid and from which the hydrogen produced may be removed, for instance, by suction.

Should circumstances render it desirable, comparatively small cathodal cells may be employed which may be conveniently placed within the apparatus. The cathodal liquid may, if necessary, be provided with a cooling arrangement. A decrease of the concentration of the acid in the anode compartment may, of course, be met by an addition of fresh acid.

When no diaphragm is employed the hydrogen liberated may be removed from time to time from the reaction chamber, or may be continuously removed by suction through gas vents disposed directly above the electrodes and extending down into the electrolyte.

Another mode of operation may be followed by not employing initially metallic mercury, but disposing the anode in such a manner upon the bottom of the container that thereby it is assured that the mercury which separates owing to reduction will come in contact with the anode.

With the acetylene oxidation processes depending upon the use of mercury salts as catalyzers, as is the case in the production of acetaldehyde, it is a well known fact that the speed at which the acetylene is absorbed increases according to the ratio in which the reaction liquid increases in its content of mercury-salts. This phenomenon is accompanied by the disadvantage that simultaneously a decided reduction of mercury-salt to metallic mercury occurs. The present invention offers the advantage that it enables the operator to work with greater quantities of mercury-salts than was hitherto customary, and, hence, to increase considerably the speed at which the acetylene is absorbed. This is possibly due to the fact that with the present method the ensuing reduction of the mercury-salt is compensated by the reoxidation of the metallic mercury that collects at the anode to a catalytically active mercury-salt.

If the process is not started with mercury-salt, but metallic mercury is employed throughout, it is necessary to first form a mercury-salt at the anode, whereupon, after an elapse of a certain space of time the absorption of acetylene starts in the desired manner.

A further advantage of the process is the possibility of using alternating current, instead of direct current, when metallic mercury is employed as the cathode.

When producing aldehyde the concentration of the acid may be varied at will, and instead of surphuric acid, other inorganic acids may be used, such as, for example, $H_3PO_4$. When a reaction liquid is employed which is a poor conductor of electricity, the distance between the electrodes should be decreased a corresponding degree.

When the process is applied for the electrolytic production of acetic acid from acetylene, two electric currents of different amperage are employed. A strong current enters the bath at an anode which we may term anode No. I, and serves to oxidize the aldehyde which is formed to acetic acid; and another weaker current which is introduced by means of a mercury anode and which we may term anode No. II. It is of no consequence whether the weaker current is branched off from the stronger current outside of the electrolytic bath, which would involve the advantage that both electric circuits may be adjusted independently of each other; or whether anode No. I is directly connected to anode No. II which would necessitate that the surfaces of the anodes be so proportioned relatively to each other that in consequence thereof the required currents of different amperage pass through the bath.

In the accompanying drawing there are shown illustrative and preferred embodiments of apparatus by means of which the method and process of my invention may be carried out; and therein Figure 1 is an elevation of an apparatus arranged to carry out the process according to Example 1; and Figure 1$^a$ is a plan view of Figure 1 showing the disposition of the electrodes, the other parts being omitted.

Figure 2 is an elevation of an apparatus arranged to carry out the process according to Example 2; and Figure 2$^a$ is a plan view of Figure 2 showing the disposition of the electrodes, the other parts being omitted.

Figure 3 is an elevation of an apparatus arranged to carry out the process according to Example 3; and Figure 3$^a$ is a plan view of Figure 3 showing the disposition of the electrodes, the other parts being omitted.

Figure 4 is an elevation of an apparatus arranged to carry out the process according to Example 4; and Figure 4$^a$ is a plan view of Figure 4 showing the disposition of the electrodes, the other parts being omitted.

Figure 5 is an elevation of an apparatus arranged to carry out the process according to Example 5; and Figure 5$^a$ is a plan view of Figure 5 showing the disposition of the electrodes, the other parts being omitted.

*Example No. 1.*

Into the anode compartment 1 (Figs. 1 and 1$^a$) of an apparatus comprising a diaphragm 3 and an agitating device 6, are placed 1 litre of a solution containing 10 per cent of sulphuric acid, 100 grams of oxide of mercury, and about 400 grams of metallic mercury. The metallic mercury added flows into the groove 8 (Fig. 1$^a$), it being understood, of course, that a plurality of grooves may be used; and serves as the anode. The solution is heated to from 70° to 80° C.— for example, by steam coils 5—agitated, and acetylene gas in a quantity exceeding the requirement is passed through the same. As is well known in the art to which our invention relates, the acetylene gas is conducted in a cyclical course within which the acetaldehyde formed during the reaction is withdrawn from the current of gas by means of a suitable absorption device. Simultaneously with the gas current, an electric current of about one ampere is passed through the solution, using a rod of lead, contained in a porous tube 2 of porcelain, as cathode. Under these conditions the absorption of acetylene is rapid and can be maintained at an approximately uniform speed for quite a long period of time. The hydrogen formed may be withdrawn from the cathode cell by means of an exit tube 4.

*Example No. 2.*

Using the same apparatus as described in connection with example No. 1, 150 grams of oxide of mercury and 150 to 200 grams of sulphate of mercury are added to 1 litre of water. This reaction liquid is heated by means of coil 5 (Fig. 2) to from 70° to 80° C., and acetylene gas in a quantity exceeding the requirement is passed through the solution. By means of a platinum anode 10 (Fig. 2) adapted to extend to the lowest point of the bath, an electric current of from 0.5 to 1.0 ampere is passed through the bath simultaneously with the flow of gas.

The metallic mercury that collects in the course of the process is oxidized on the anode thus providing continuously a sufficient quantity of catalyzer by its solution of the $H_2SO_4$ present.

*Example No. 3.*

1 litre of a solution containing approximately 10 per cent of sulphuric acid, and 500 grams of mercury are placed in an agitator. The mercury serves as the anode 8 (Figs. 3 and 3ª), while a rod of lead, or of another metal or an alloy, immersed into the acid bath, is used as the cathode 2. At first a quantity of mercury-salt is produced by electrolysis which is sufficient to start the reaction. While the solution is being heated by means of coil 5 to from 70° to 80° C. an excess of acetylene gas is passed through the liquid which is agitated during the reaction. The current of acetylene passes in a cyclical course in which the acetaldehyde formed during the reaction is withdrawn from the said current by means of suitable absorption devices. Simultaneously with the acetylene gas, a current of electricity of approximately 1 ampere is passed through the reaction liquid. The cyclical current of acetylene gas will gradually become richer and richer in hydrogen which requires removal from time to time. After the removal of the hydrogen the apparatus is refilled with pure acetylene.

*Example No. 4.*

A container provided with an agitator 6 (Figs. 4 and 4ª) and having two indentions 8 and 8' of a suitable size within its bottom for the reception of the electrodes which in this case consist both of metallic mercury, is filled with 1 litre of a solution containing 10 per cent of sulphuric acid. By passing through the bath an alternating current a sufficient quantity of mercury-salt is produced first. Thereupon the liquid is heated by means of coil 5 to from 70° to 80° C. and an excess of acetylene gas is passed through the bath while the same is agitated in any well known manner. The acetylene gas is conducted in a cyclical course within which the acetaldehyde formed during the reaction is withdrawn from the gas current by means of suitable absorption devices. Simultaneously with the gas current an alternating current of electricity of about 1 ampere is passed through the bath. The cyclical current of acetylene will gradually become richer and richer in hydrogen which requires removal from time to time. After the removal of the hydrogen the apparatus is refilled with pure acetylene.

*Example No. 5.*

In a container provided with an agitator 6 (Figs. 5 and 5ª) and a diaphragm 3 are placed 500 cubic centimetres of a solution containing 25 per cent of sulphuric acid, and 500 grams of metallic mercury which serves as an anode 8, No. II, by means of a conductor which must be insulated against the electrolyte. Within the anode chamber 1 there is placed a perforated sheet of lead 11 or platinum serving as an anode No. I. For the return of the current a single cathode 2 common to both currents, consisting, for instance, of lead, is used which is placed in sulphuric acid of 25 per cent strength. The operation is performed in three phases. The first phase is devoted to the formation of a sufficient quantity of mercury-salt for which purpose the solution is heated by means of coils 5 to from 30° to 40° C., and while the agitator is in operation a current of about 0.5 ampere is passed through the anode No. II. During the second working phase approximately 10 to 15 litres of acetylene gas is passed through the bath with the agitator in operation. The third phase is devoted to a further electrolytic treatment. For that purpose an electric current is passed through anode No. I of such a strength that approximately the entire quantity of acetaldehyde forming is oxidized to acetic acid, so that the excess of aldehyde present at the beginning of the third phase is retained throughout the operation.

In accordance with the above described conditions a continuous and rapid absorption of acetylene is secured and a smooth oxidation of the aldehyde to acetic acid takes place, without the necessity of replacing any of the mercury catalyzer, and in consequence there is also no necessity for a separate operation of regenerating the relatively inactive catalyzer, which regeneration is always accompanied by a certain loss of catalytically active substance.

We claim:

1. A process of increasing and maintaining the catalytic activity of mercury compounds in processes involving the oxidation of acetylene which comprises, passing a current of acetylene through an acid bath in the presence of a catalyzer consisting of a mercury compound, and treating the bath by means of an electric current and a metallic mercury anode, whereby the catalyzer is regenerated.

2. A process of increasing and maintaining the catalytic activity of mercury compounds in processes involving the oxidation of acetylene which comprises, passing a current of acetylene gas through an acid bath containing a mercury compound as a catalyzer, whereby an absorption of acetylene is obtained, and alternately passing an electric current through said bath said electric current being introduced by means of a metallic mercury anode, whereby the catalyzer is regenerated.

3. A process of increasing and maintaining the catalytic activity of mercury compounds in processes involving the oxidation of acetylene which comprises, passing a current of acetylene gas through an acid bath containing a mercury compound as a catalyzer, whereby an absorption of acetylene is obtained, and oxidizing the metallic mercury formed during the reaction by means of an electric current, whereby the catalyzer is regenerated.

4. A process of increasing and maintaining the catalytic activity of mercury compounds in processes involving the oxidation of acetylene which comprises, passing a current of acetylene gas through an acid bath containing a mercury compound as a catalyzer, whereby an absorption of acetylene is obtained, and oxidizing the metallic mercury formed during the reaction by means of an electric current and a metallic anode placed where the metallic mercury collects within the said bath, whereby the catalyzer is regenerated.

5. A process of increasing and maintaining the catalytic activity of mercury compounds in processes involving the oxidation of acetylene which comprises, adding to an acid bath metallic mercury, employing the said metallic mercury as an anode and another metallic rod as a cathode and electrolytically producing a quantity of mercury-salt, thereafter passing a current of acetylene gas through said bath, and simultaneously passing an electric current through said bath to continuously regenerate the catalytically active mercury-salt.

6. A process of increasing and maintaining the catalytic activity of mercury compounds in processess involving the oxidation of acetylene which comprises, passing a current of acetylene through an acid bath containing a mercury compound as catalyzer, and treating the bath by means of an electric current and a metallic mercury anode to regenerate said catalyzer, placing the cathode in a porous compartment and removing from said compartment the hydrogen produced during the electrolysis.

7. A process of increasing and maintaining the catalytic activity of mercury compounds in processes involving the oxidation of acetylene which comprises, passing a current of acetylene gas through an acid bath containing a mercury compound as a catalyzer to produce an absorption of acetylene, oxidizing the metallic mercury formed by means of an electric current to regenerate said catalyzer, placing the cathode in a porous compartment and removing therefrom the hydrogen produced during the electrolysis.

8. A process of increasing and maintaining the catalytic activity of mercury compounds in processes involving the oxidation of acetylene which comprises, adding to an acid bath metallic mercury, employing the said metallic mercury as an anode and another metallic rod as a cathode and electrolytically producing a quantity of mercury-salt, thereafter passing a current of acetylene gas and simultaneously an electric current through said bath to continuously regenerate the catalytically active mercury-salt, placing said cathode in a porous compartment and removing therefrom the hydrogen produced during the electrolysis.

9. A process of increasing and maintaining the catalytic activity of mercury compounds in processes involving the oxidation of acetylene which comprises, passing a current of acetylene through an acid bath containing a mercury compound as catalyzer, treating the bath by means of an electric current introduced by means of a metallic mercury anode, whereby the catalyzer is regenerated, and removing, at intervals, from the reaction chamber the hydrogen formed.

10. A process of increasing and maintaining the catalytic activity of mercury compounds in processes involving the oxidation of acetylene which comprises, passing a current of acetylene gas through an acid bath containing a mercury compound as a catalyzer, whereby an absorption of acetylene is obtained, oxidizing the metallic mercury formed during the reaction by means of an electric current, whereby the catalyzer is regenerated, and removing, at intervals, from the reaction chamber the hydrogen formed.

11. A process of increasing and maintaining the catalytic activity of mercury compounds in processes involving the oxidation of acetylene which comprises, adding to an acid bath metallic mercury, employing the said metallic mercury as an anode and another metallic rod as a cathode and electrolytically producing a quantity of mercury-salt, thereafter passing a current of acetylene gas through said bath, simultaneously passing an electric current through said bath to continuously regenerate the catalytically active mercury-salt, and removing, at intervals, from the reaction chamber the hydrogen formed.

12. A process of increasing and maintaining the catalytic activity of mercury compounds in processes involving the oxidation of acetylene which comprises, passing a current of acetylene through an acid bath containing a mercury compound as catalyzer, treating the bath by means of an electric current, introduced by means of a metallic mercury anode, whereby the catalyzer is regenerated, and continuously removing the hydrogen produced during the electrolysis by means of gas conductors arranged above each electrode and extending into the electrolyte.

13. A process of increasing and maintaining the catalytic activity of mercury compounds in processes involving the oxidation of acetylene which comprises, passing a current of acetylene gas through an acid bath containing a mercury compound as a catalyzer, whereby an absorption of acetylene is obtained, oxidizing the metallic mercury formed during the reaction by means of an electric current, whereby the catalyzer is regenerated, and continuously removing the hydrogen produced during the reaction by means of gas conductors arranged above each electrode and extending into the electrolyte.

14. A process of increasing and maintaining the catalytic activity of mercury compounds in processes involving the oxidation of acetylene which comprises, adding to an acid bath metallic mercury, employing the said metallic mercury as an anode and another metallic rod as a cathode and electrolytically producing a quantity of mercury-salt, thereafter passing a current of acetylene gas through said bath, simultaneously passing an electric current through said bath to continuously regenerate the catalytically active mercury-salt, and continuously removing the hydrogen produced during the reaction by means of gas conductors arranged above each electrode and extending into the electrolyte.

15. A process of increasing and maintaining the catalytic activity of mercury compounds in processes involving the oxidation of acetylene which comprises, passing through an acid bath containing a mercury compound as a catalyzer a current of acetylene gas and an alternating electric current introduced by means of metallic mercury electrodes, whereby during the absorption of acetylene the catalyzer is continuously regenerated.

16. A process of increasing and maintaining the catalytic activity of mercury compounds in processes involving the oxidation of acetylene which comprises, adding to an acid bath metallic mercury, employing electrodes of metallic mercury and electrolytically producing a quantity of mercury-salt by means of an alternating current, thereafter passing a current of acetylene gas through said bath, and simultaneously passing an electric alternating current through said bath to continuously regenerate the catalytically active mercury-salt.

17. A process of increasing and maintaining the catalytic activity of mercury compounds in processes involving the oxidation of acetylene which comprises, passing through an acid bath containing a mercury compound as a catalyzer a current of acetylene gas and an alternating electric current introduced by means of metallic mercury electrodes, whereby during the absorption of acetylene the catalyzer is continuously regenerated, and removing, at intervals, from the reaction chamber the hydrogen formed during the electrolysis.

18. A process of increasing and maintaining the catalytic activity of mercury compounds in processes involving the oxidation of acetylene which comprises, passing through an acid bath containing a mercury compound as a catalyzer a current of acetylene gas and an alternating electric current introduced by means of metallic mercury electrodes to regenerate said catalyzer during the absorption of acetylene, placing said electrodes in porous compartments and removing therefrom the hydrogen produced during the electrolysis.

19. A process of increasing and maintaining the catalytic activity of mercury compounds in processes of electrolytically producing acetic acid from acetaldehyde, consisting in, passing through an acid bath an electric current introduced by means of a metallic mercury anode to form catalytically active mercury-salt, then passing a current of acetylene gas through said bath until a quantity of acetaldehyde is formed, and thereupon passing through said bath and in conjunction with said first named electric current and said gas current a second electric current by means of metallic electrodes, whereby the acetaldehyde formed is continuously oxidized to acetic acid, while said first named electric current acts to regenerate said catalyzer.

20. A process of increasing and maintaining the catalytic activity of mercury compounds in processes of electrolytically producing acetic acid from acetaldehyde, consisting in, passing through an acid bath an electric current introduced by means of a metallic mercury anode to form catalytically active mercury-salt, then passing a current of acetylene gas through said bath until a quantity of acetaldehyde is formed, and thereupon passing through said bath and in conjunction with said first named electric current and said gas current a second electric current by means of metallic electrodes, whereby the acetaldehyde formed is continuously oxidized to acetic acid, while said first named electric current acts to regenerate said catalyzer, said second named electric circuit being branched off from said first named electric circuit.

21. A process of increasing and maintaining the catalytic activity of mercury compounds in processes involving the oxidation of acetylene which comprises, adding to the reaction liquid a larger proportion of mercury-salt than was hitherto usual in acetylene oxidation processes, passing a current of acetylene through the said reaction liquid, and treating said reaction liquid with an electric current introduced by means of a metallic mercury anode.

22. A process of increasing and maintaining the catalytic activity of mercury compounds in processes involving the oxidation of acetylene which comprises, adding to the reaction liquid a larger proportion of mercury-salt than was hitherto usual in acetylene addition processes, passing a current of acetylene through the said reaction liquid, and oxidizing the metallic mercury formed during the reaction by means of an electric current.

23. A process of increasing and maintaining the catalytic activity of mercury compounds in processes involving the oxidation of acetylene which comprises, adding to the reaction liquid a larger proportion of mercury-salt than was hitherto usual in acetylene addition processes, passing through said reaction liquid a current of acetylene gas, treating the said reaction liquid with an electric current, said electric current being introduced by means of a metallic mercury anode to regenerate the catalytically active mercury-salt placing the cathode in a porous compartment, and removing therefrom the hydrogen produced during the electrolysis.

24. A process of increasing and maintaining the catalytic activity of mercury compounds in processes involving the oxidation of acetylene which comprises, adding to the reaction liquid a larger proportion of mercury-salt than was hitherto usual in acetylene addition processes, passing a current of acetylene through the said reaction liquid, oxidizing the metallic mercury formed during the reaction with an electric current, placing the cathode within a porous compartment and removing therefrom the hydrogen formed during the electrolysis.

25. A process of increasing and maintaining the catalytic activity of mercury compounds in processes involving the oxidation of acetylene which comprises, adding to the reaction liquid a larger proportion of mercury-salt than was hitherto usual in acetylene addition processes, passing a current of acetylene through the said reaction liquid, treating said reaction liquid with an electric current introduced by means of a metallic mercury anode, and removing, at intervals, from the reaction chamber the hydrogen formed during the electrolysis.

26. A process of increasing and maintaining the catalytic activity of mercury compounds in processes involving the oxidation of acetylene which comprises, adding to the reaction liquid a larger proportion of mercury-salt than was hitherto usual in acetylene addition processes, passing through said reaction liquid a current of acetylene gas, and an electric current introduced by means of a metallic mercury anode to regenerate the catalytically active mercury-salt, and continuously removing the hydrogen formed during the electrolysis by means of gas conductors placed above each electrode and extending into the electrolyte.

27. A process of increasing and maintaining the catalytic activity of mercury compounds in processes involving the oxidation of acetylene which comprises, adding to the reaction liquid a larger proportion of mercury-salt than was hitherto usual in acetylene addition processes, passing a current of acetylene through the said reaction liquid, and treating said reaction liquid with an alternating electric current introduced by means of metallic mercury electrodes.

28. A process of increasing and maintaining the catalytic activity of mercury compounds in processes involving the oxidation of acetylene which comprises, adding to the reaction liquid a larger proportion of mercury-salt than was hitherto usual in acetylene addition processes, passing through said reaction liquid a current of acetylene gas and an alternating electric current introduced by means of metallic mercury electrodes to continuously regenerate the catalytically active mercury-salt, and removing, at intervals, from the reaction chamber the hydrogen formed during the electrolysis.

In testimony whereof we have signed our names to this specification in the presence of two subscribing witnesses.

DIPL. ING. NATHAN GRÜNSTEIN.
DR. PAUL BERGE.
Witnesses:
PETER VÖHL,
WILHELM METZ.